United States Patent
Hast

(10) Patent No.: US 9,420,222 B2
(45) Date of Patent: Aug. 16, 2016

(54) AUTOMATIC IMAGE DELETION

(71) Applicant: Nokia Corporation, Espoo (FI)

(72) Inventor: Marcus Johan Hast, Malmo (SE)

(73) Assignee: Nokia Technologies Oy, Espoo (FI)

( * ) Notice: Subject to any disclaimer, the term of this patent is extended or adjusted under 35 U.S.C. 154(b) by 240 days.

(21) Appl. No.: 14/165,637

(22) Filed: Jan. 28, 2014

(65) Prior Publication Data

US 2015/0215573 A1   Jul. 30, 2015

(51) Int. Cl.
*H04N 5/91*   (2006.01)
*G06F 12/02*   (2006.01)

(52) U.S. Cl.
CPC ............... *H04N 5/91* (2013.01); *G06F 12/023* (2013.01)

(58) Field of Classification Search
CPC . H04N 1/2112; H04N 5/91; G08B 13/19665; G06F 12/023; G06F 17/30138; G06F 3/0644; G06F 17/30244; G06F 17/3028; G06F 17/30781; G06F 17/30858; G06F 17/3007; G06F 17/3012; G06F 17/30123; G06F 17/30126; G06F 3/0643; G06F 3/064; G06F 3/0608
See application file for complete search history.

(56) References Cited

U.S. PATENT DOCUMENTS

| | | | |
|---|---|---|---|
| 6,522,354 B1 * | 2/2003 | Kawamura | H04N 1/00302 348/231.2 |
| 7,508,424 B2 * | 3/2009 | Hayashi | H04N 1/00204 348/207.1 |
| 7,933,936 B2 * | 4/2011 | Aggarwal | G06F 17/30138 707/812 |
| 8,004,593 B2 * | 8/2011 | Kusaka | H04N 1/00315 348/211.1 |
| 8,032,683 B2 | 10/2011 | Habuto et al. | 710/303 |
| 8,208,040 B2 * | 6/2012 | Nakase | G06F 17/30274 348/231.2 |
| 8,385,171 B2 * | 2/2013 | Matsushima | G11B 19/10 348/207.1 |
| 2001/0050875 A1 | 12/2001 | Kahn et al. | 365/229 |
| 2002/0054224 A1 * | 5/2002 | Wasula | H04N 1/2112 348/231.6 |
| 2002/0063781 A1 * | 5/2002 | Aizawa | H04N 5/232 348/211.99 |
| 2003/0035054 A1 * | 2/2003 | Ohmura | G11B 27/105 348/231.2 |
| 2003/0095196 A1 * | 5/2003 | Misawa | H04N 5/772 348/231.99 |
| 2005/0151858 A1 * | 7/2005 | Nozaki | H04N 1/2112 348/231.9 |
| 2005/0158015 A1 * | 7/2005 | Nakayama | G11B 27/034 386/241 |
| 2005/0283356 A1 | 12/2005 | Wang | |
| 2006/0171523 A1 | 8/2006 | Greenwell | |
| 2006/0179084 A1 | 8/2006 | Thomas | |

(Continued)

FOREIGN PATENT DOCUMENTS

| JP | 2007-243568 A | 9/2007 |
|---|---|---|
| KR | 2009-0001347 A | 1/2009 |

OTHER PUBLICATIONS

"Use the camera you love to showcase your best shots in real-time"., http://www.eye.fi; 2014, 2 pgs.
"Photo Sync w/Picasa and google Plus, SD Card Full, Odd Question", http://androidforums.com/android-appliations/718951-photo-sync-w-picasa-google-plus-sd-card-full-odd-question.html; 2014, 3 pgs.
"Automatic Backup of User Uploaded Images Using Cloudinary", Nadav Soferman, http://cloudinary.com/blog/; Jul. 18, 2012, 14 pgs.

*Primary Examiner* — Aung S Moe
(74) *Attorney, Agent, or Firm* — Harrington & Smith

(57) ABSTRACT

An apparatus and method including determining if a copy of an image file of an image has been transmitted from an apparatus as a backup copy of the image file; determining if the image file has predetermined metadata based upon a user handling or manipulating the image file after the image was captured by the apparatus; and automatically deleting the image from the apparatus based upon both the image file having been determined to have been transmitted from the apparatus as the backup copy of the image file, and the image file having been determined to not have the predetermined metadata based upon the user handling or manipulating the image file after the image was captured by the apparatus.

24 Claims, 9 Drawing Sheets

(56) References Cited

U.S. PATENT DOCUMENTS

| | | | |
|---|---|---|---|
| 2006/0226232 A1* | 10/2006 | Helkio | H04M 1/72522 235/472.01 |
| 2008/0271112 A1 | 10/2008 | Waker | |
| 2009/0129742 A1 | 5/2009 | Takamiya | |
| 2011/0050913 A1* | 3/2011 | Kim | H04N 1/2112 348/207.1 |
| 2011/0193994 A1* | 8/2011 | Nozawa | H04N 5/772 348/231.3 |
| 2012/0044366 A1 | 2/2012 | Anderson | |
| 2013/0132329 A1 | 5/2013 | Raghavan | 706/52 |
| 2013/0286249 A1* | 10/2013 | Yost | H04N 5/772 348/231.99 |
| 2014/0226909 A1* | 8/2014 | Montalvo | G11B 27/105 382/224 |

* cited by examiner

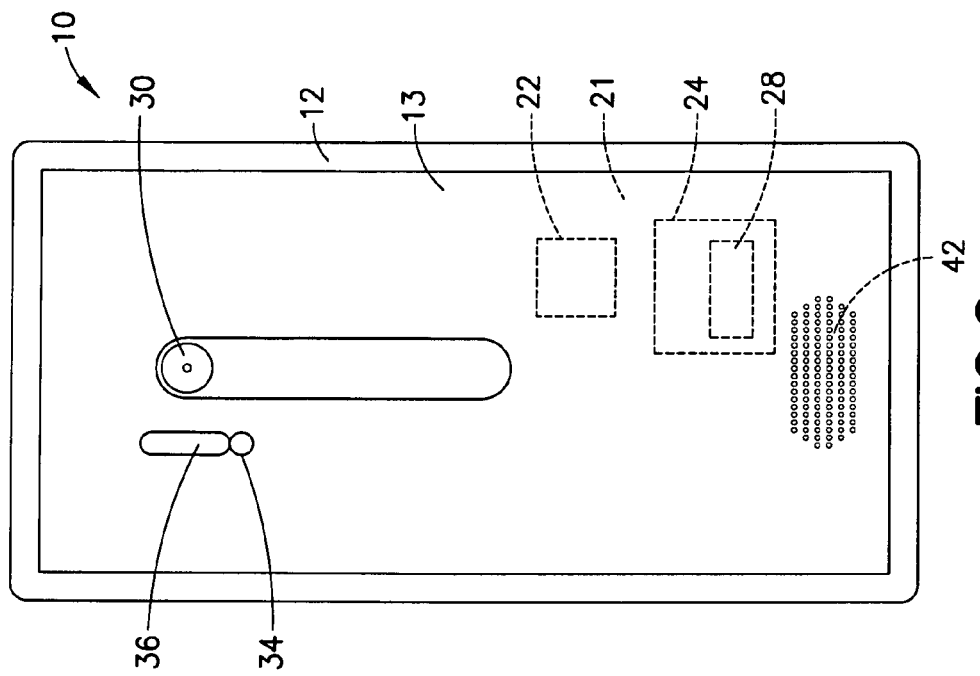
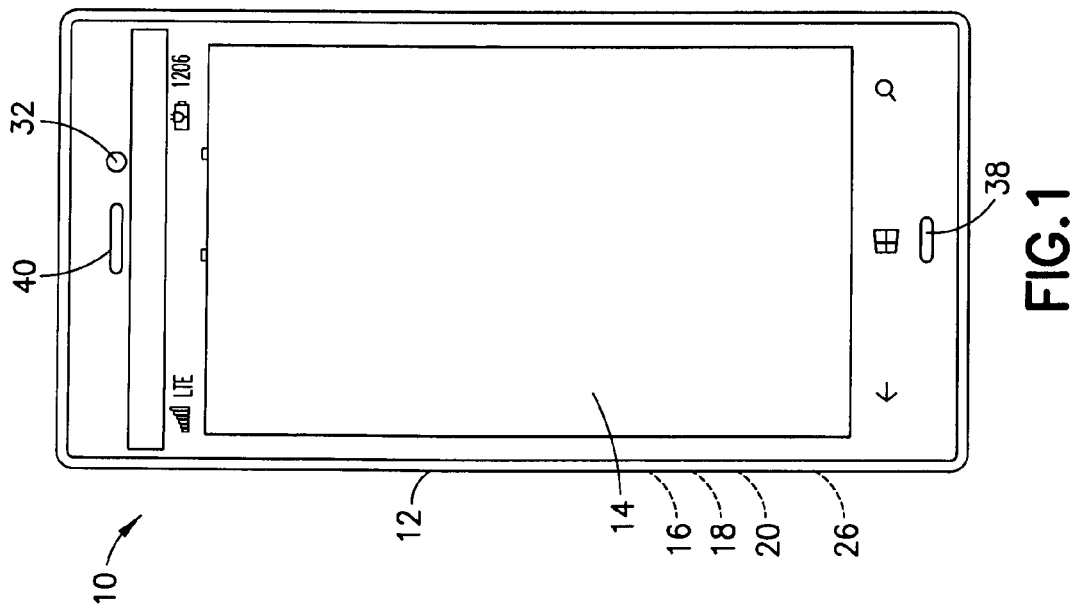

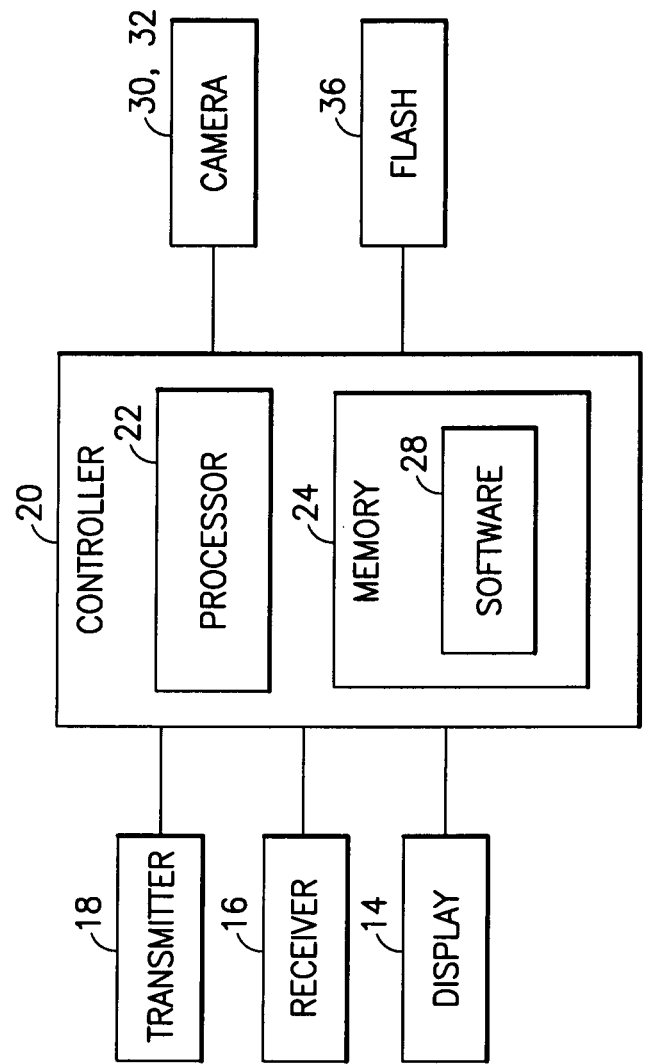

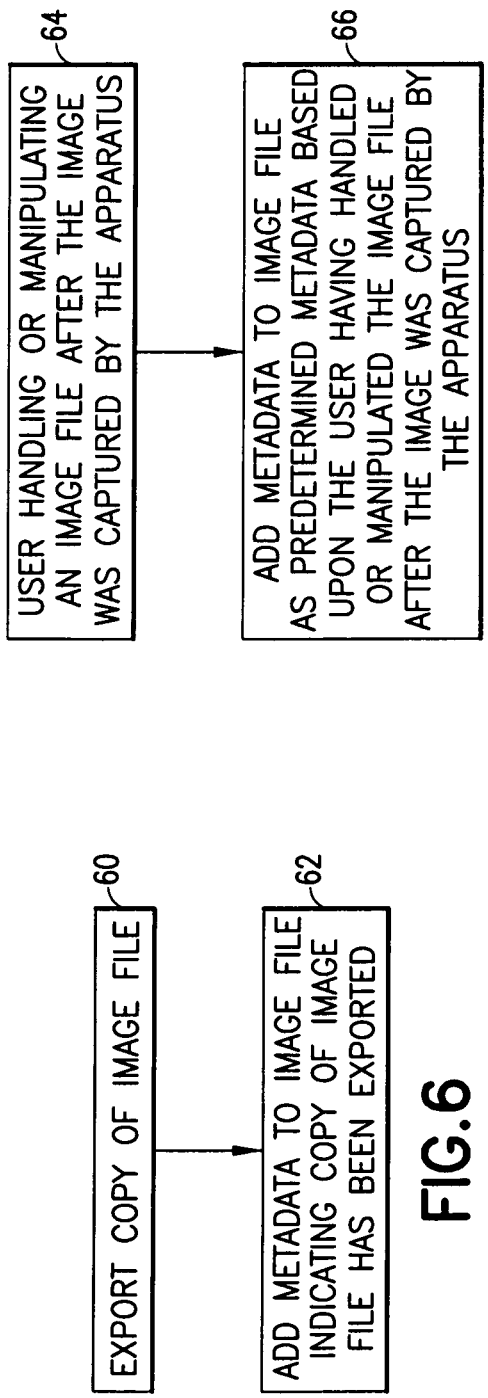

IMAGE FILE – PROPERTIES /48

DESCRIPTION
  TITLE: ☐
  SUBJECT: ☐
  RATING: ☐
  TAGS: ☐
  COMMENTS: ☐

AUTOMATIC DELETION PARAMETERS
  BACKUP COPY TRANSFERRED: ☐ /68
  USER HANDLED OR MANIPULATED: ☐ /70
  BACKUP COPY IMPORTED (AUTOMATIC DELETION RESTRICTION): ☐ /88

OTHER
  IMAGE FILE SHARED: ☐ /72
  IMAGE EDITED: ☐ /74
  GROUP: ☐ /82
  GROUP SELECTED IMAGE: ☐ /84
  IMAGE VIEWER DELETION INDICATION: ☐ /86
  NUMBER OF VIEWS: ☐ /90

FIG.8

AUTOMATIC IMAGE DELETION

BACKGROUND

1. Technical Field

The exemplary and non-limiting embodiments relate generally to digital images and, more particularly, to deleting digital images from an apparatus.

2. Brief Description of Prior Developments

Devices having a digital camera, such as a smartphone for example, are well known. Images taken by the digital camera are stored in an internal memory in images files, such as still images and video images for example. If the image files are not deleted, and the user continues to capture additional images, the internal memory will become full, and the device will be prevented from storing any additional images.

SUMMARY

The following summary is merely intended to be exemplary. The summary is not intended to limit the scope of the claims.

In accordance with one aspect, an example embodiment is provided in an apparatus comprising at least one processor; and at least one non-transitory memory including computer program code, the at least one memory and the computer program code configured to, with the at least one processor, cause the apparatus at least to automatic deletion of at least one image from the at least one memory when a copy of an image file of the image is determined to have been transmitted from the apparatus as a backup copy of the image file, and the image file is determined to not have predetermined metadata based upon a user handling or manipulating the image file after the image was captured by the apparatus. The automatic deletion does not occur when the copy of the image file has not been transmitted from the apparatus as a backup copy of the image, and where the automatic deletion does not occur when the image file has the predetermined metadata based upon the user handling or manipulating the image file after the image was captured by the apparatus.

In accordance with one aspect, an example method comprises determining if a copy of an image file of an image has been transmitted from an apparatus as a backup copy of the image file; determining if the image file has predetermined metadata based upon a user handling or manipulating the image file after the image was captured by the apparatus; and automatically deleting the image from the apparatus based upon both the image file having been determined to have been transmitted from the apparatus as the backup copy of the image file, and the image file having been determined to not have the predetermined metadata based upon the user handling or manipulating the image file after the image was captured by the apparatus.

In accordance with one aspect, an example embodiment is provided in a non-transitory program storage device readable by a machine, tangibly embodying a program of instructions executable by the machine for performing operations, the operations comprising determining if a copy of an image file of an image has been transmitted from an apparatus as a backup copy of the image file; determining if the image file has predetermined metadata based upon a user handling or manipulating the image file after the image was captured by the apparatus; and automatically deleting the image from the apparatus based upon both the image file having been determined to have been transmitted from the apparatus as a backup copy of the image file, and the image file having been determined to not have the predetermined metadata based upon the user handling or manipulating the image file after the image was captured by the apparatus.

BRIEF DESCRIPTION OF THE DRAWINGS

The foregoing aspects and other features are explained in the following description, taken in connection with the accompanying drawings, wherein:

FIG. 1 is a front view of an example embodiment of an apparatus comprising features as described herein;

FIG. 2 is a rear view of the apparatus shown in FIG. 1;

FIG. 3 is a diagram illustrating some components of the apparatus shown in FIGS. 1-2;

FIG. 6 is a diagram illustrating an example method;

FIG. 7 is a diagram illustrating an example method;

FIG. 8 is a diagram illustrating example metadata of the image file shown in FIG. 46;

DETAILED DESCRIPTION OF EMBODIMENTS

Figure 4:
FIG. 4 is a diagram illustrating a digitally captured image being formed into an image file in the apparatus.

Referring to FIG. 1, there is shown a front view of an apparatus 10 incorporating features of an example embodiment. Although the features will be described with reference to the example embodiments shown in the drawings, it should be understood that features can be embodied in many alternate forms of embodiments. In addition, any suitable size, shape or type of elements or materials could be used.

The apparatus 10 may be a hand-held portable apparatus, such as a communications device which includes a telephone application for example. In the example shown the apparatus 10 is a smartphone which includes a camera and a camera application. The apparatus 10 may additionally or alternatively comprise an Internet browser application, a video recorder application, a music player and recorder application, an email application, a navigation application, a gaming application, and/or any other suitable electronic device application. In an alternate example embodiment the apparatus might not be a smartphone.

Referring also to FIGS. 2-3, the apparatus 10, in this example embodiment, comprises a housing 12, a touchscreen 14, a receiver 16, a transmitter 18, a controller 20, a rechargeable battery 26 and a camera 30. However, all of these features are not necessary to implement the features described below. The controller 20 may include at least one processor 22, at least one memory 24, and software 28. The electronic circuitry inside the housing 12 may comprise at least one printed wiring board (PWB) 21 having components such as the controller 20 thereon. The receiver 16 and transmitter form a primary communications system to allow the apparatus 10 to communicate with a wireless telephone system, such as a mobile telephone base station for example.

In this example, the apparatus 10 includes the camera 30 which is located at the rear side 13 of the apparatus, a front camera 32, an LED 34, and a flash system 36. The LED 34 and the flash system 36 are also visible at the rear side of the apparatus, and are provided for the camera 30. The cameras 30, 32, the LED and the flash system 36 are connected to the controller 20 such that the controller 20 may control their operation. In an alternate example embodiment the rear side may comprise more than one camera, and/or the front side could comprise more than one camera. The apparatus 10 includes a sound transducer provided as a microphone 38. In an alternate example the apparatus may comprise more than one microphone. The apparatus 10 includes a sound transducer provided as an earpiece 40, and a sound transducer provided as a speaker 42. More or less than one speaker may be provided.

Referring also to FIG. 4, the apparatus 10 is configured to capture images by means of its camera 30 or 32, such as image 44 for example, and store the image in the memory 24 as an image file 46. The image 44 may be a still image or a video image for example. The image file includes a portion 47 having the image 44 and a portion 48 having metadata for the image file such as, for example, the date the image was captured, title, subject, location of the apparatus 10 when the image was captured (such as with use of GPS for example), rating, tags, and comments. These are only some examples of the metadata which may be stored in the image file. Some of the metadata may be added or changed after the image file is created, such as by adding a comment for example.

Figure 5:
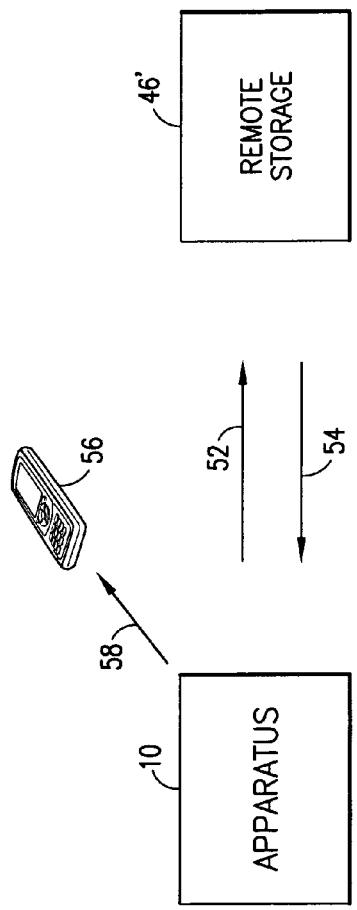
FIG. 5 is a diagram illustrating transferring of image files from and to the apparatus.

Referring also to FIG. 5, the apparatus 10 is configured to transmit a copy of the image files 46 to a remote storage device 50 as indicated by arrow 52. The remote storage device 50 may be a personal PC or cloud storage or server for example. The transmission 52 may be via the Internet and use the wireless transmitter 18 for example. This is merely an example of the transmission 52. Any suitable downloading/uploading or export/import of the image files 46 between the apparatus 10 and another device as a backup or duplicate copy of the image files in the apparatus 10 may be provided. One or more of the backup image file 46' may be downloaded back to the apparatus 10 when desired as indicated by arrow 54. As indicated by arrow 58, a copy of the image file may also be transmitted to another device 56, such as other smartphone for example, as a sharing of the image file with another person.

In the example embodiment shown, the apparatus is configured to automatically record, as one of the pieces of metadata 48, an indication if a copy of an image file has been transmitted from the apparatus 10 to another device as a backup or duplicate copy of the image file. Referring also to FIG. 6, as indicated by block 60 an example method may comprise exporting a copy 46' of the image file 46 to the remote storage 50, and adding metadata to the image file 46 indicating that a copy of the image file has been exported as indicated by block 62.

Also in the example embodiment shown, the apparatus is configured to automatically record, as one of the pieces of metadata 48, an indication if a user has handled or manipulated the image file 46 after the image was captured by the apparatus 10. The handling or manipulation may comprise, for example, editing of the image (such as with digital image editing software for example), sharing the image with another user (such as sharing 58 for example), or adding a comment to the image (such as adding text to a comment field in the metadata 48 for example). These are only some examples and should not be considered as limiting. Referring also to FIG. 7, as indicated by block 64 an example method may comprise a user handling or manipulating the image file 46 after the image was captured by the apparatus 10, and adding metadata to the image file 46 based upon the user having handled or manipulated the image file as indicated by block 66.

Referring also to FIG. 8, an example is shown where the metadata 48 of the image file 46 includes a field 68 to indicate that the transmission 52 has occurred, and a field 70 to indicate that the user has handled or manipulated the image file 46 after the image was captured by the apparatus 10. The field 70 may be used as predetermined metadata to determine if the image file may be automatically deleted by the apparatus 10 as further understood below. The entry in the field 70 may be determined based upon entries in other fields of the metadata, such as field 72 and/or 74 for example. Metadata field 72 may store an indication if the image file 46 has been shared, such as by transmission 58 for example. Metadata field 74 may store if or when the image 44 has been edited, such as the digital image 44 being changed after it was captured. Entries into these fields 72, 74, or other predetermined user handling or manipulation fields, may cause an entry into the field 70. Alternatively, the field 70 may not be provided and, instead, predetermined user handling or manipulation fields (such as 72 and/or 74 for example) may be used in the method described below.

Figure 9:
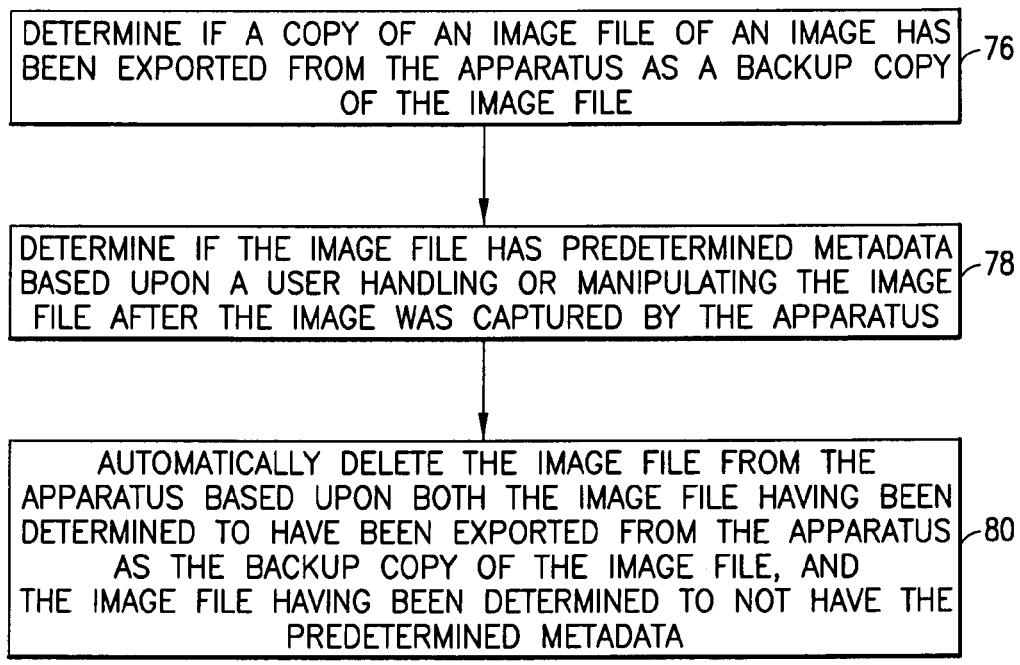
FIG. 9 is a diagram illustrating an example method.

Features as described herein may be used to delete image files on the apparatus 10, which the user is least interested in, after duplicating the image files, such as online with another device for example. Referring also to FIG. 9, an example method may comprise determining if a copy 46' of the image file 46 has been exported or otherwise transmitted from the apparatus 10 as a backup or duplicate copy of the image file 46 as indicated by block 76; determining if the image file 46 has predetermined metadata 70, 72, 74 based upon a user handling or manipulating the image file after the image 44 was captured by the apparatus 10 as indicated by block 78; and as indicated by block 80 automatically deleting the image file 46 from the apparatus 10 based upon both the image file having been determined to have been exported from the apparatus as the backup copy of the image file, and the image file having been determined to not have the predetermined metadata.

Features as described herein may provide a program which may be run on a mobile device with access to internet, where the mobile device has limited storage space. With the ease and low cost of taking a lot of images with a digital camera, users often end up having a lot of images on the device. The images may be automatically duplicated to another device, such as a cloud-based storage solution for example, and some of these images may be shared by the user or manually edited by the user. With a conventional device, at some point the user runs out of memory space on the device, but the user still wants to take new pictures.

With features as described herein, once an image has been captured on the apparatus the image file may be sent into a queue to be uploaded as a backed-up copy to a different device, such as via the Internet for example, at an earliest convenient time (subject to user preferences, network availability, etc.) After the image file has been backed-up, the local copy of the image on the apparatus 10 may be marked as "duplicated" or "backed-up" such as with field 68 for example. An image which has been handled or manipulated by the user (e.g. "edited", "shared" or "commented" for example) may be marked with a corresponding status, such as in field 70 for example. When memory image storage space on the apparatus 10 is beginning to run low, the system may then automatically delete image files (or at least the image portion 47 of the image files) which have been marked as "duplicated" or "backed-up", and which do not have contrary indications in other predetermined metadata fields. In other words, the system may automatically delete image files (or at least the image portion 47 of the image files) which have been marked as "duplicated" or "backed-up", where the files do not have the predetermined metadata fields 70, 72, 74 having been marked for example.

If multiple images are captured at a same time and/or in a same location, these image files may be grouped by the system. Field 82 in FIG. 8 for example shows that a Group indicator may be stored as metadata for each of the image files. Algorithms may be used to try to find the best image and mark it as such (e.g., the sharpest image). Field 84 in FIG. 8 for example shows that a Group Selected Image indicator may be stored as metadata for each of the image files in the group.

The system may be configured to still track the removed image, such as with metadata field 86 being used to create a file having no image viewing data but still having as least some of the original metadata for the deleted image. The system may be configured to download one or more of the image files 46' back from the server after the original file 46 was deleted if the user wants to. A removed image or image file may be noted when browsing the images on the display 14, such as when reaching a grouping where the removed image(s) would have been included (e.g. when sorting by date or location). In one type of example a removed image may be illustrated on an image viewer by use of a small thumbnail of the removed image(s) to make it easier for the user to determine if the user wants to download the removed image(s) to the apparatus again. It may also be possible to find "similar" deleted images when viewing an image based on location or time. Group fields 82 and/or 84 may be used for this purpose. In another example, the apparatus may be configured to automatically download previews of deleted images from the device 46' if the user wants to look at them.

Any image that has been manually re-downloaded 54 by the user may be marked with this information, such as at metadata field 88, and in the future the metadata field 88 may be used such that the image file will not be automatically removed again.

Features as described herein may be used to prevent indiscriminately deleting images based upon more than a user explicitly "locking" the image file. Features as described herein may appear seamless to the user with the only difference of removing the "clutter" of old files which are of little interest.

In one example embodiment a "living" type of metadata may be provided where at least some of the metadata of an image file changed based upon the user's interaction with that image file. The method may be applied to a set of images existing in the apparatus where the images are grouped based on content, time or other criteria. The method may also be applied to one or more images which are no longer on the apparatus; stored in another device. In one type of example method means may be provided to delete, undelete, arrange and/or replace images based on the living metadata. An "undelete" operation may comprise an at least partial restoration of a file, which was previously at least partially deleted from the apparatus 10, from a backup copy of the file stored on the server 50. An example method to undelete may comprise a living image folder on the apparatus where images are dynamically changed based on user interaction, such as on the apparatus and/or at the device 46, such as 'hits' in with on online album viewable by a plurality of people. This example method may allow for deleting of low scoring images from the apparatus 10 and undeleting the high scoring ones on the apparatus 10 and/or the server 46', or replacing some from an image pool or portfolio, such as on the server 46', to enhance a 'story' the images provide. If the portfolio is online on the server 46', the scoring may also be applied directly to the user's images by third parties.

One of the features as described herein is the use of "living metadata" for a media file, such as an image file or video file for example. In particular, metadata may change based upon the file being manipulated or handled, and that changed metadata may them be used as a basis for additional actions. The living metadata may include, for example, tracking deletion of an image, tracking undeletion of an image, and/or grouping of images. The "living metadata" feature is not limited for use with only the apparatus 10, and may comprise input and interaction with server 50 and/or other devices 56.

Figure 10:
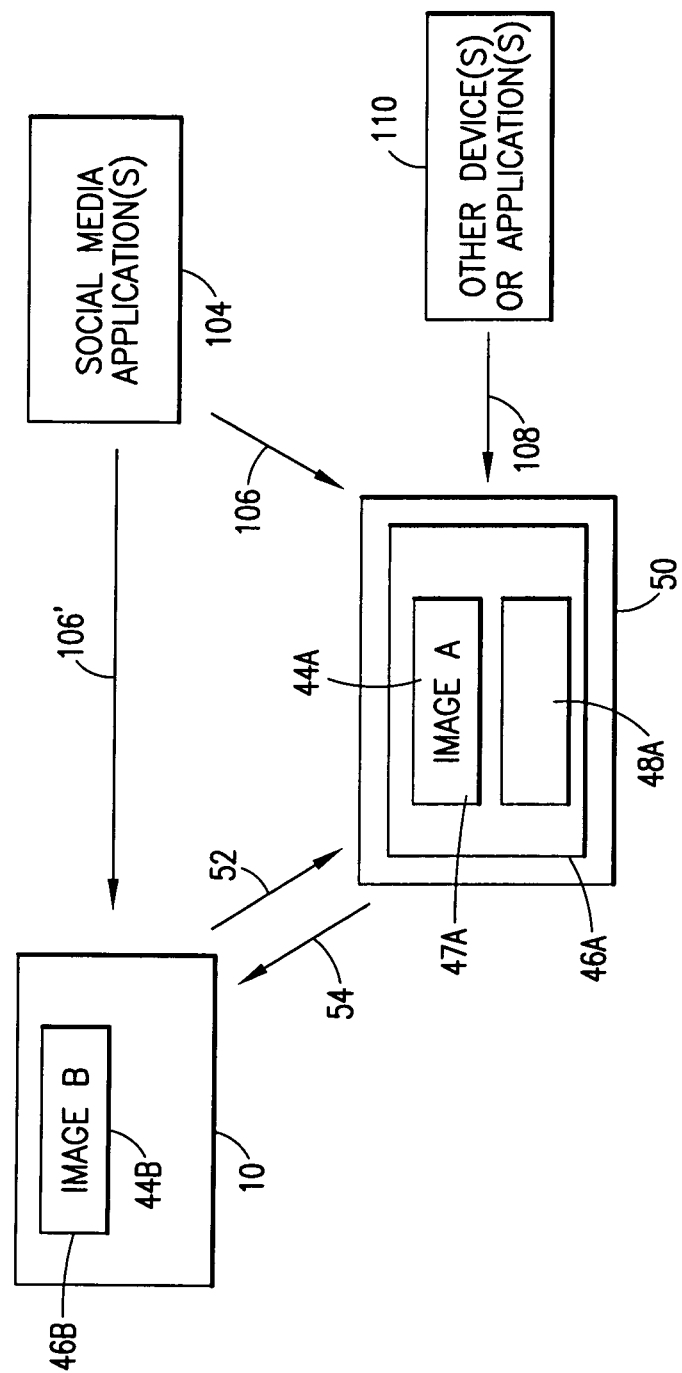
FIG. 10 is a diagram illustrating an example method.

One example may comprise the image file having a number of views field 90 as illustrated in FIG. 8. The apparatus may be configured to delete one or more of the images in a group 82 based upon the number of views for the image in that group. For example, the apparatus 10 may be configured to delete all the images in a group except for the images with the highest number in the Number of Views filed 90. As another example, the apparatus 10 may be configured to delete all the images in a group except for a predetermined number images with the highest number in the Number of Views filed 90, such as 2 or 3 or 4 or 5 or 6 images for example. These are merely some examples and should not be considered as limiting. Referring also to FIG. 10, in one type of example embodiment, if the number of views of an image 44A on the server 50 exceed the number of views of a different image 44B on the apparatus 10, where 44A and 44B have a same group in 82, then the apparatus 10 may be configured to automatically undelete image 44A and automatically delete image 44B, where image 44B is backup onto the server 50. Thus, a portfolio or group of images may be viewed on the apparatus 10, and other images of the same group not viewed because the images have been deleted, based upon metadata which changes over time, such that the viewed images may change over time. This is because of the "living" or "dynamic" metadata which may be used as a basis for determining which images are deleted or not deleted, and this basis may be updated and acted upon based upon the changes to the "living" or "dynamic" metadata.

The living, dynamic metadata fields may include, for example Number of Views field 90 or any other suitable metadata entry which tracks or is updated based upon actions regarding an image file after the image file is created. For example, one type of metadata field may be a number of entries, such as "likes" for example, entered for an image via one or more social media applications, such as FACEBOOK for example. Input from other social media applications, such as TWITTER for example, may alternatively or additionally be used for tracking or updating one or more living, dynamic metadata fields. For example, with reference to FIG. 10, input 106 from one or more social media applications 104 may be used to change or update at least one metadata in the metadata portion 48A of the image file 46A. Likewise, input 108 form one or more other devices or applications 110 may be used to change or update at least one portion of metadata in the metadata portion 48A of the image file 46A. The other application(s) 110 may be at least partially in the apparatus 10. Alternatively or additionally, input 106' from one or more social media applications 104 may be used to change or update at least one metadata in the metadata portion 48A of the image file 46A' or image file 46B shown in FIG. 11.

Figure 11:
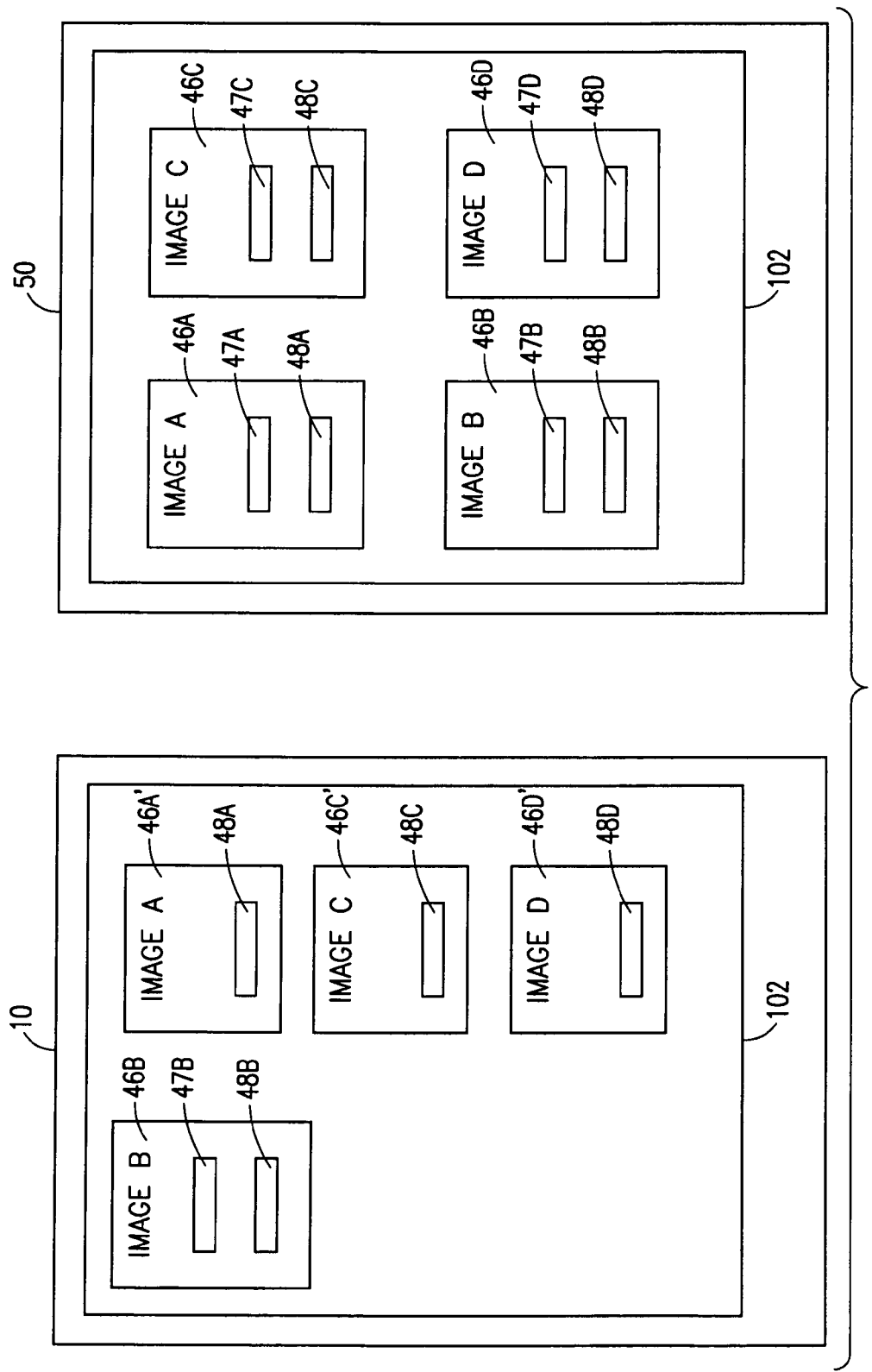
FIG. 11 is a diagram illustrating a grouping of image files in the apparatus and a same group in a server.

FIG. 11 illustrates a group 102 of image files 46A-D on the server 50 which have been grouped together, and the corresponding files 46B, 46A', 46C' and 46D' on the apparatus 10. For the group 102 on the apparatus 10 each image file has a metadata portion 48A-48D, but only image B has the image portion 47A. For the group 102 on the server 50 all of the files have both the image portions 47A-47D and the metadata portions 48A-48D.

Figure 12:
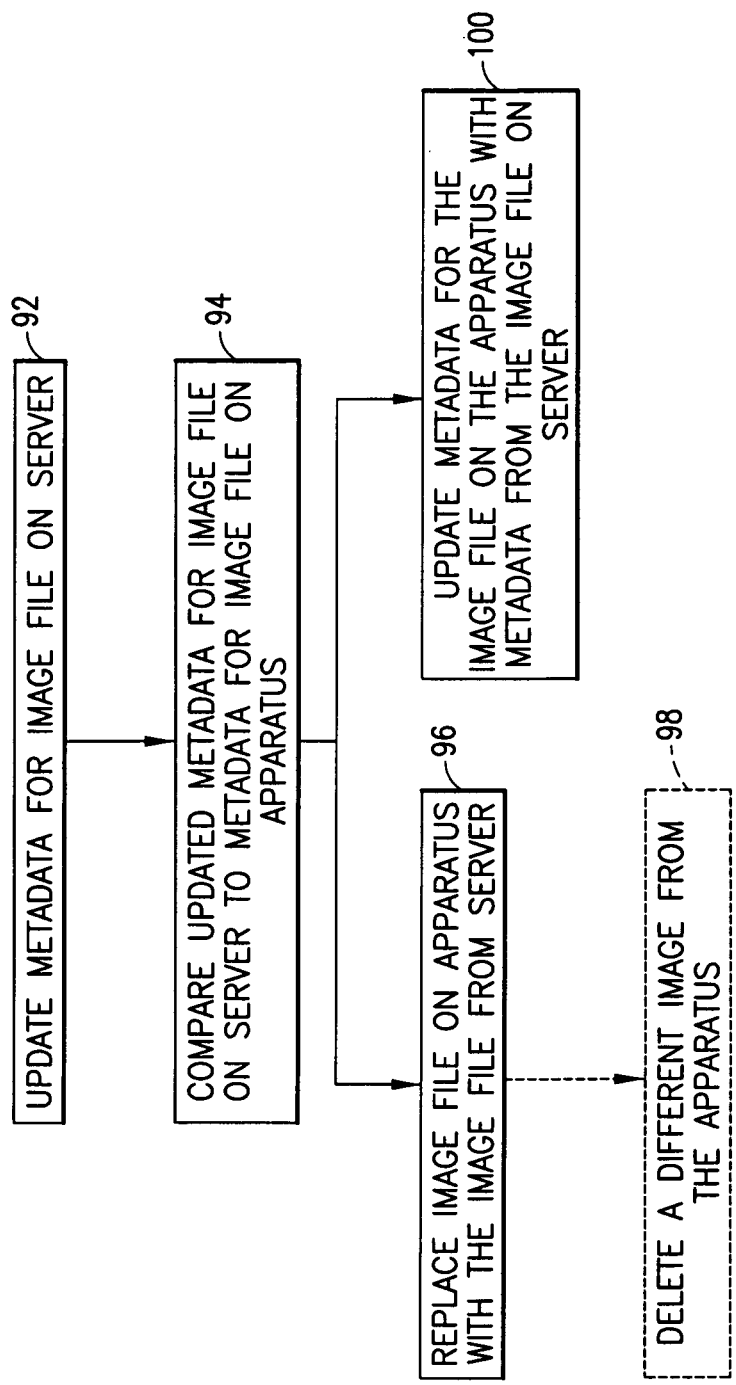
FIG. 12 is a diagram illustrating an example method.

The updating of the "living metadata" such as 90 for example, is not limited to input at the apparatus 10. For example, referring to FIG. 12, as indicated by block 92 metadata for an image file 44A on the server 50 may be updated based at least partially upon a predetermined manipulation or handling or viewing of the image file 44A while on the server 50. This may be, for example, the image 44A being viewed by third parties and metadata field 90 being updated based upon the number of views or "hits" of the image file. As indicated by block 94, the apparatus 10 and/or the server 50 may be configured to compare the metadata in the image file for the image 44A on the server 50 to the metadata in the image file for the same image on the apparatus 10. Then, based at least partially upon the comparison, the apparatus 10 and/or server 50 may be configured to automatically replace the image file on the apparatus 10 with the image file on the server 50 as indicated by block 96 or, automatically update the metadata for the image file on the apparatus with the metadata from the image file on the server as indicated by block 100. For block 96 the replacement is effectively an automatic "undelete" of the image from the apparatus 10 based upon the "living" dynamic metadata associated with that image; the living metadata being on the apparatus 10 and/or the server 50 and/or other apparatus 56 for example. If the image file on the apparatus 10 is replace with the image file from the server, then a different image may be automatically deleted from the apparatus 10 as indicated by block 98. The apparatus 10 may be configured to allow the user to indicate or select one or more parameters for replacement, and/or to ignore or override a replacement in predetermined circumstances. For example the system may be able to allow a user to indicate that replacement should only happen if the number of "hits" for an image on the server 50 is at least a predetermined number or percentage larger than the number of "hits" for the image on the apparatus 10, such as 10 hits or 5 percent for example. Thus, a user configurable setting or override for the automatic replacement or updating may be provided on the apparatus.

As noted above, it may be possible to access or manipulate a file on a server, such as if a service such as SKYDRIVE for example is used to back up the content. In that case the metadata update, or other image file update, could be propagated to the apparatus 10 and used to mark an image (such as with metadata as "accessed", "shared", etc.) on the apparatus even if the file has not been accessed on the apparatus 10 itself. Features as described herein may be used in a viewer having a "live window tile" for example where changing images on the "live window tile" change over time. The images chosen to be shown in the "live window" may be based, at least partially, upon the "living metadata" field(s) in the metadata 48.

Features as described herein may be used with the NOKIA STORYTELLER application which may be used to automatically sorts photos, videos and cinemagraphs into interactive groups called stories. In the STORYTELLER application a timeline is where one may browse all stories and modify them, then view them as slideshows or share them with friends. One may also sort photos and videos by location, as well as add captions to tell even more of the story. Plus, when one is looking at a photo, one can zoom out to see where the photo was taken on a map. A Shared link in an image may indicate that one is able to share a photo-based story with other people, such as via a social media application or web site for example.

An example embodiment may be provided in an apparatus comprising at least one processor 22; and at least one non-transitory memory 24 including computer program code 28, the at least one memory and the computer program code configured to, with the at least one processor, cause the apparatus at least to perform automatic deletion of at least one image file 46 from the at least one memory when a copy 46' of the image file of the image is determined to have been transmitted from the apparatus as a backup copy of the image file, and the image file 46 is determined to not have predetermined metadata based upon a user handling or manipulating the image file after the image was captured by the apparatus, where the automatic deletion does not occur when the copy of the image file has not been transmitted from the apparatus as a backup copy of the image, and where the automatic deletion does not occur when the image file has the predetermined metadata based upon the user handling or manipulating the image file after the image was captured by the apparatus.

The at least one memory and the computer program code are configured to, with the at least one processor, automatically undelete the at least one image from the apparatus based upon a predetermined event or predetermined data, such as the events and data differences and comparisons noted in the example embodiments described above for example. The apparatus may be configured to automatically add metadata to the image file when the image file has been transmitted from the apparatus as a backup copy of the image file. Thus, the apparatus may be configured to automatically add metadata to the image file based upon the image file having been transmitted from the apparatus as a backup copy of the image file. The apparatus may be configured to automatically add metadata to the image file prior to and/or after the image file has been transmitted from the apparatus as a backup copy of the image file. The apparatus may be configured to automatically add metadata to the image file when the image file is handled or manipulated by the user after the image was captured by the apparatus. Thus, the apparatus may be configured to automatically add metadata to the image file based upon the image file having been handled or manipulated by the user after the image was captured by the apparatus. The predetermined metadata may comprise metadata regarding at least one of the image file having been edited by the user after the image was captured by the apparatus, the image file having been shared by the user with another apparatus or another user, the user adding a comment or title to the image file. The apparatus may be configured to automatically add metadata to a plurality of the at least one image file indicating a group of the at least one image file with one another, where the group is based upon a common time and/or date of capture of the respective images, and/or based upon a common location of the apparatus during capture of the respective images. The apparatus may be configured to automatically select one of the images in the group and add metadata to the image file for the selected image to prevent the automatic deletion of the selected image. The apparatus may be configured to provide an indicator for an image viewer of the apparatus for an image file which has been automatically deleted. The apparatus may be configured to automatically provide an indicator for an image viewer of the apparatus identifying at least one similar image in the memory for an image file which has been automatically deleted. The apparatus may be configured to automatically add metadata to an image file which has been imported to the apparatus from the backup copy of the image file to prevent the imported image file from being automatically deleted again from the apparatus. The apparatus may further comprise a housing; at least one printed wiring board in the housing, where the least one printed wiring board has the at least one memory and the at least one processor connected thereto; a battery connected to the least one printed wiring board; an electronic display connected to least one printed wiring board; and at least one camera connected to the least one printed wiring board.

An example method may comprise determining if a copy of an image file of an image has been transmitted from an apparatus as a backup copy of the image file; determining if the image file has predetermined metadata based upon a user handling or manipulating the image file after the image was captured by the apparatus; and automatically deleting the image file from the apparatus based upon both the image file having been determined to have been transmitted from the apparatus as the backup copy of the image file, and the image file having been determined to not have the predetermined metadata based upon the user handling or manipulating the image file after the image was captured by the apparatus.

The method may further comprise automatically adding metadata to the image file when the image file has been transmitted from the apparatus as a backup copy of the image file. The method may further comprise automatically adding metadata to the image file when the image file is handled or manipulated by the user after the image was captured by the apparatus. The predetermined metadata comprises metadata regarding at least one of the image file having been edited by the user after the image was captured by the apparatus, the image file having been shared by the user with another apparatus or another user, the user adding a comment or title to the image file. The method may further comprise automatically adding metadata to a plurality of the at least one image file indicating a group of the at least one image file with one another, where the group is based upon a common time and/or date of capture of the respective images, and/or based upon a common location of the apparatus during capture of the respective images. The method may further comprise automatically selecting one of the images in the group and adding metadata to the image file for the selected image to prevent the automatic deletion of the image file for the selected image. The method may further comprise providing an indicator for an image viewer of the apparatus for an image file which has been automatically deleted. The method may further comprise automatically providing an indicator for an image viewer of the apparatus identifying at least one similar image in the memory for an image file which has been automatically deleted. The method may further comprise automatically adding metadata to an image file which has been imported to the apparatus from the backup copy of the image file to prevent the imported image file from being automatically deleted again from the apparatus.

An example embodiment may be provided in a non-transitory program storage device, such as 24 for example, readable by a machine, tangibly embodying a program of instructions executable by the machine for performing operations, the operations comprising determining if a copy of an image file of an image has been transmitted from an apparatus as a backup copy of the image file; determining if the image file has predetermined metadata based upon a user handling or manipulating the image file after the image was captured by the apparatus; and automatically deleting the image file from the apparatus based upon both the image file having been determined to have been transmitted from the apparatus as a backup copy of the image file, and the image file having been determined to not have the predetermined metadata based upon the user handling or manipulating the image file after the image was captured by the apparatus.

An example embodiment may be provided in an apparatus comprising at least one processor; and at least one non-transitory memory including computer program code, the at least one memory and the computer program code configured to, with the at least one processor, cause the apparatus at least to perform automatic deletion of at least one image from the at least one memory based upon at least one automatic deletion parameter, and subsequent automatic undeletion of the at least one image from the at least one memory based upon at least one automatic undeletion parameter. The at least one automatic deletion parameter and the at least one automatic undeletion parameter may be a same parameter such as a number of view or "hits" of an image in an image file. The automatic undeletion may also be used when there has been a previous manual or non-automatic deletion from the apparatus. The apparatus may also be configured to prevent the automatic undeletion, such as a metadata field in the metadata portion of an image file on the apparatus 10 for example.

Any combination of one or more computer readable medium(s) may be utilized as the memory. The computer readable medium may be a computer readable signal medium or a non-transitory computer readable storage medium. A non-transitory computer readable storage medium does not include propagating signals and may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing.

Features as described above have been described with use of metadata information stored in the image file. It should be understood that the information used for determining whether or not an image file should be automatically deleted might not be stored as metadata and may be stored in a file separate from the image file, such as a lookup table for example.

It should be understood that the foregoing description is only illustrative. Various alternatives and modifications can be devised by those skilled in the art. For example, features recited in the various dependent claims could be combined with each other in any suitable combination(s). In addition, features from different embodiments described above could be selectively combined into a new embodiment. Accordingly, the description is intended to embrace all such alternatives, modifications and variances which fall within the scope of the appended claims.

What is claimed is:

1. An apparatus comprising:
   at least one processor; and
   at least one non-transitory memory including computer program code,
   the at least one memory and the computer program code configured to, with the at least one processor, cause the apparatus at least to perform:
   automatic deletion of at least one image from the at least one memory when:
      a copy of an image file of the image is determined to have been transmitted from the apparatus as a backup copy of the image file, and
      the image file is determined to not have predetermined metadata based upon a user handling or manipulating the image file after the image was captured by the apparatus,
      where the automatic deletion does not occur when the copy of the image file has not been transmitted from the apparatus as a backup copy of the image, and where the automatic deletion does not occur when the image file has the predetermined metadata based upon the user handling or manipulating the image file after the image was captured by the apparatus.

2. An apparatus as in claim 1 where the at least one memory and the computer program code are configured to, with the at least one processor, automatically undelete the at least one image from the apparatus based upon a predetermined event or predetermined data or predetermined parameter.

3. An apparatus as in claim 1 where the at least one memory and the computer program code are configured to, with the at least one processor, automatically add metadata to the image file based upon transmission of the image file from the apparatus as a backup copy of the image file.

4. An apparatus as in claim 1 where the at least one memory and the computer program code are configured to, with the at least one processor, automatically add metadata to the image file based upon handling or manipulation of the image file by the user after the image was captured by the apparatus.

5. An apparatus as in claim 1 where the predetermined metadata comprises metadata regarding at least one of:
the image file having been edited by the user after the image was captured by the apparatus,
the image file having been shared by the user with another apparatus or another user,
the user adding a comment or title to the image file.

6. An apparatus as in claim 1 where the at least one memory and the computer program code are configured to, with the at least one processor, automatically add metadata to a plurality of the at least one image file indicating a group of the at least one image file with one another, where the group is based upon a common time and/or date of capture of the respective images, and/or based upon a common location of the apparatus during capture of the respective images.

7. An apparatus as in claim 6 where the at least one memory and the computer program code are configured to, with the at least one processor, automatically select one of the images in the group and add metadata to the image file for the selected image to prevent the automatic deletion of the selected image.

8. An apparatus as in claim 1 where the at least one memory and the computer program code are configured to, with the at least one processor, provide an indicator for an image viewer of the apparatus for an image file which has been automatically deleted.

9. An apparatus as in claim 1 where the at least one memory and the computer program code are configured to, with the at least one processor, automatically provide an indicator for an image viewer of the apparatus identifying at least one similar image in the memory for an image file which has been automatically deleted.

10. An apparatus as in claim 1 where the at least one memory and the computer program code are configured to, with the at least one processor, automatically add metadata to an image file which has been imported to the apparatus from the backup copy of the image file to prevent the imported image file from being automatically deleted again from the apparatus.

11. An apparatus as in claim 1 further comprising:
a housing;
at least one printed wiring board in the housing, where the least one printed wiring board has the at least one memory and the at least one processor connected thereto;
a battery connected to the least one printed wiring board;
an electronic display connected to least one printed wiring board; and
at least one camera connected to the least one printed wiring board.

12. A method comprising:
determining if a copy of an image file of an image has been transmitted from an apparatus as a backup copy of the image file;
determining if the image file has predetermined metadata based upon a user handling or manipulating the image file after the image was captured by the apparatus; and
automatically deleting the image from the apparatus based upon both the image file having been determined to have been transmitted from the apparatus as the backup copy of the image file, and the image file having been determined to not have the predetermined metadata based upon the user handling or manipulating the image file after the image was captured by the apparatus.

13. A method as in claim 12 further comprising automatically undeleting the image based upon a predetermined event or predetermined data or predetermined parameter.

14. A method as in claim 12 further comprising automatically adding metadata to the image file based upon transmission of the image file from the apparatus as a backup copy of the image file.

15. A method as in claim 12 further comprising automatically adding metadata to the image file based upon handling or manipulation of the image file by the user after the image was captured by the apparatus.

16. A method as in claim 12 where the predetermined metadata comprises metadata regarding at least one of:
the image file having been edited by the user after the image was captured by the apparatus,
the image file having been shared by the user with another apparatus or another user,
the user adding a comment or title to the image file.

17. A method as in claim 12 further comprising automatically adding metadata to a plurality of the at least one image file indicating a group of the at least one image file with one another, where the group is based upon a common time and/or date of capture of the respective images, and/or based upon a common location of the apparatus during capture of the respective images.

18. A method as in claim 17 further comprising automatically selecting one of the images in the group and adding metadata to the image file for the selected image to prevent the automatic deletion of the image file for the selected image.

19. A method as in claim 12 further comprising providing an indicator for an image viewer of the apparatus for an image file which has been automatically deleted.

20. A method as in claim 12 further comprising automatically providing an indicator for an image viewer of the apparatus identifying at least one similar image in the memory for an image file which has been automatically deleted.

21. A method as in claim 12 further comprising automatically adding metadata to an image file which has been imported to the apparatus from the backup copy of the image file to prevent the imported image file from being automatically deleted again from the apparatus.

22. A non-transitory program storage device readable by a machine, tangibly embodying a program of instructions executable by the machine for performing operations, the operations comprising:
determining if a copy of an image file of an image has been transmitted from an apparatus as a backup copy of the image file;
determining if the image file has predetermined metadata based upon a user handling or manipulating the image file after the image was captured by the apparatus; and
automatically deleting the image from the apparatus based upon both the image file having been determined to have been transmitted from the apparatus as a backup copy of the image file, and the image file having been determined to not have the predetermined metadata based upon the user handling or manipulating the image file after the image was captured by the apparatus.

23. A device as in claim 22 where the operations further comprise automatic undeleting of the image based upon a predetermined event or predetermined data.

24. An apparatus comprising:
at least one processor; and
at least one non-transitory memory including computer program code,
the at least one memory and the computer program code configured to, with the at least one processor, cause the apparatus at least to perform:
automatic deletion of at least one image from the at least one memory based upon at least one automatic deletion parameter, and
subsequent automatic undeletion of the at least one image from the at least one memory based upon at least one automatic undeletion parameter.

* * * * *